Figure 1:
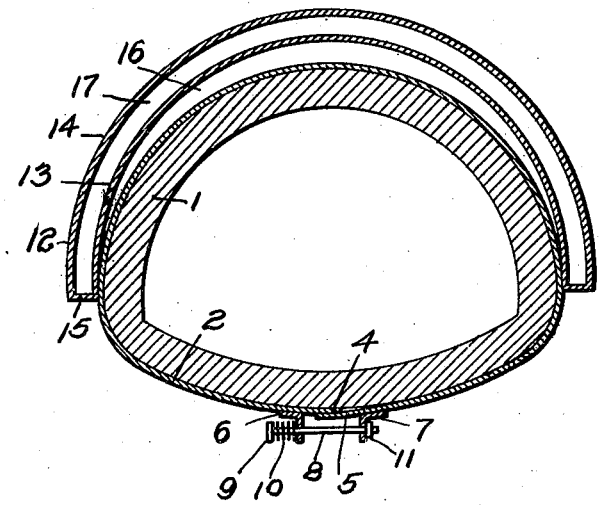

Mar. 13, 1923.

P. R. CASSIDY 1,448,194

FURNACE

Filed Nov. 4, 1921

2 sheets-sheet 1

WITNESSES
J. Herbert Bradley.

INVENTOR
Perry R. Cassidy
By Winter & Brown
attys.

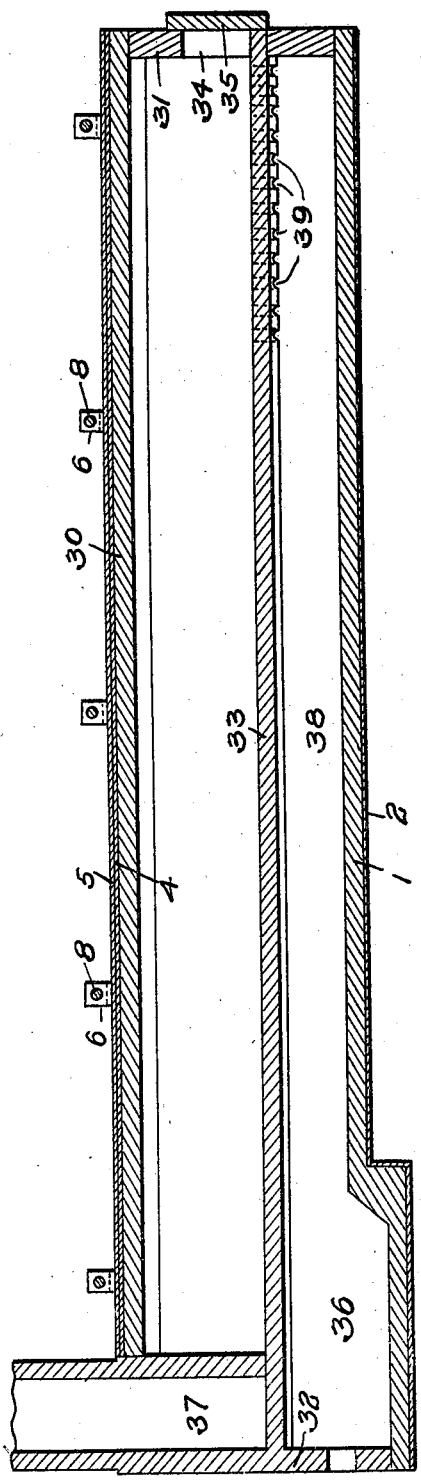

Patented Mar. 13, 1923.

1,448,194

UNITED STATES PATENT OFFICE.

PERRY R. CASSIDY, OF PLAINFIELD, NEW JERSEY, ASSIGNOR TO PITTSBURGH SEAMLESS TUBE COMPANY, OF BEAVER FALLS, PENNSYLVANIA, A CORPORATION OF PENNSYLVANIA.

FURNACE.

Application filed November 4, 1921. Serial No. 512,747.

*To all whom it may concern:*

Be it known that I, PERRY R. CASSIDY, a citizen of the United States, and a resident of Plainfield, in the county of Union and State of New Jersey, have invented a new and useful Improvement in Furnaces, of which the following is a specification.

The invention relates to stationary horizontal or approximately horizontal industrial furnaces and ovens of various kinds, such as annealing furnaces for steel products, metal heating furnaces for forging, rolling and tube mill work, metal refining furnaces, reverberatory furnaces, open hearth furnaces, roasting furnaces, malleable iron furnaces, soaking pit furnaces, glass melting tanks, glass annealing furnaces, by-product coke furnaces and other similar industrial heating furnaces or ovens which ordinarily are built of refractory brick or blocks to provide a heating chamber comprising a hearth or floor, side walls, and a roof or crown.

Heretofore, furnaces and ovens of the character described have been of substantially rectangular cross-section, built of refractory brick or blocks and comprising vertical side walls and an arched crown or roof sprung between or on top of the side walls, and of such size that the resulting stresses required that their walls be thick and held together by various arrangements of buck stays and tie bolts, skew-backs, or suspended metallic arch hangers or supports. When such furnaces or ovens, built according to the usual practice, are fired or heated up, the refractory lining expands, the joints open up and the bricks crack, thus exposing larger areas of the refractory brick or blocks for the absorption of heat, with the result that the refractory lining disintegrates or burns out, the roof or crown rapidly weakens and collapses, and the side walls become cracked and open at the joints with a resultant large loss or dissipation of heat. Furthermore the expansion of the refractory lining makes it necessary to loosen the tie rods in order to prevent the buck stay or tie rods from breaking or the wall from collapsing. Furthermore this prior construction requires such thickness of wall and roof or crown and such heavy and strong buck stays, tie rods, and the like, in order to secure reasonable strength and durability, that the cost of construction is correspondingly high, and this together with the short life of furnaces so constructed renders them expensive. The opening up of the seams in the wall and the cracking and dropping out of brick also renders such furnaces uneconomical in operation due to the large dissipation of heat.

In an application filed by the executors of James P. Sneddon, deceased, Serial No. 512,950, filed November 4, 1921, (Case A) there is illustrated and described a construction of furnaces and ovens of the kind and for the purposes named whose initial cost is considerably less than that of present designs of such furnaces and ovens but whose durability or life nevertheless is much longer, which are so constructed as to automatically take care of the expansion and contraction of the walls which occur when the furnaces are being heated up or cooled down, and in which the loss of heat by radiation is reduced, thereby effecting economy in the consumption of fuel, said furnaces or ovens comprising a stable structure formed by walls which, in lieu of being rectangular in cross section, are in the form of a circle, ellipse, or other continuous-curve form approximately a circle or ellipse and consisting of a continuous inner wall built up of refractory brick or blocks and being under compression, and an outer continuous-curve sheet metal casing or shell surrounding the compression wall and forming a tension member which resists radial and tangential stresses due to the expansion of the compression wall, said table structure being such as to automatically take care of the expansions and contractions which occur when the furnace is being heated up or cooled down.

This invention is an improvement upon the construction illustrated and described in the aforesaid identified application, but like it comprises a stationary substantially horizontal furnace of continuous-curve in cross section forming a stable structure composed of an inner compression wall and an outer metal shell under tension and in which changes in size and stresses due to expansion and contraction of the compression wall are automatically compensated for.

One object of the invention is to provide a special compensating means which will be applicable to furnaces varying in cross-sectional shape, either with or without transverse arches. A further object is to provide such a compensating means as can be adjusted to change the tension of the outer metal shell whenever desirable or necessary. A still further object is to provide such a furnace with a novel arrangement and construction of flues for the passage of air or gases for recuperation purposes or for cooling.

The invention is applicable to all furnaces and ovens of the character specified, whether of the direct heating, semi-muffled, or muffled type.

Figure 2:
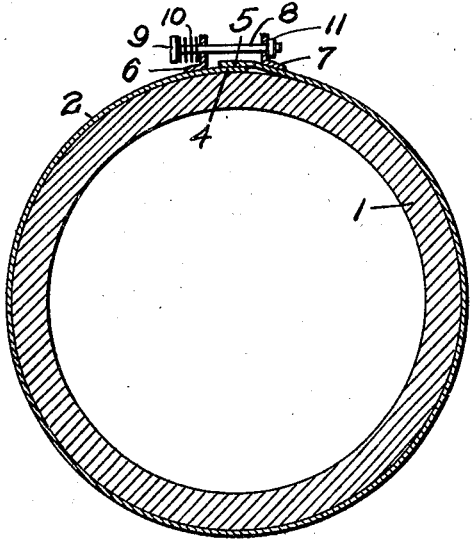
Figure 3:
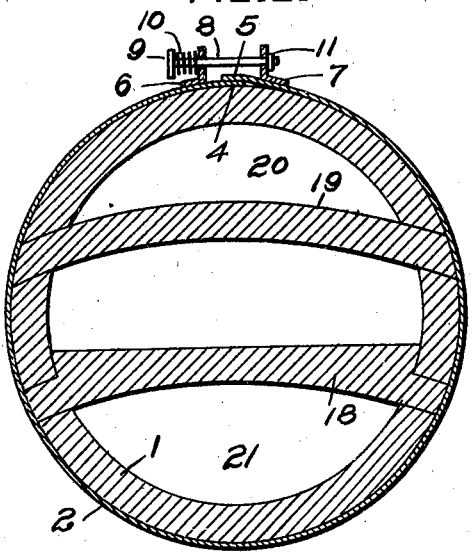

In the accompanying drawings, Fig. 1 shows a transverse section through the body of a furnace embodying the invention; Fig. 2 illustrates the application of the slip-joint comprising one feature of the invention to a furnace which is circular in cross-section; Fig. 3 is a view similar to Fig. 2 in which the furnace is provided with internal transverse arches; and Fig. 4 is a longitudinal section through a muffle furnace for removing hydrogen from tubes to which the invention is applied.

In each of the forms illustrated, 1 designates an inner wall built up of refractory material, preferably refractory brick or blocks, comprising an inner compression wall which is encased in an outer sheet metal casing or shell 2 forming a tension member resisting radial and tangential stresses.

The outer shell 2 completely surrounds the inner compression wall and has overlapping ends 4 and 5 to provide a slip-joint extending throughout the length of the furnace. Attached to the ends 4 and 5 are the angle plates 6 and 7, respectively. Each pair of angle plates is provided with a bolt 8 which passes through perforations therein. Disposed between the head 9 thereof and angle plate 6 is a coil spring 10 the tension of which, and consequently the tension of the outer shell 2, may be varied by turning nut 11 on said bolt. The construction described is indicative only of an outer shell provided with a slip-joint and one form of adjustable tension means, the invention in its broad aspect contemplating a stable structure such as described comprising an outer metal shell provided with a slip-joint and tension means therefor.

Attached to the outer shell 2 by any suitable means, as by riveting, is a curved member 12 comprising the spaced plates 13 and 14 connected at 15. The curvature of the member 12 differs from that of the roof portion of the furnace providing a crescent-shaped flue 16 between the outer shell 2 and the inner plate 13, and the space between the plates provides an additional flue 17. Air for combustion purposes passes through the flue 16 and is heated both by the main body of the furnace and by flue gases which pass through the flue 17.

The construction of slip-joint shown is identical in the several forms illustrated except that in Fig. 1 it is placed below the furnace so as not to interfere with the flues 16, 17, while in Figs. 2, 3 and 4, it is disposed at the top of the furnace.

In the form illustrated in Fig. 3 transverse arches 18 and 19 are sprung across the body of the furnace providing a flue 20 which may be used to admit air for combustion and the flue 21 which may be used for recuperation purposes. The space between the arches forms the furnace proper.

Fig. 4 illustrates the invention embodied in a muffle furnace for removing hydrogen from tubes and consists of the longitudinal wall 30 and the usual end walls 31 and 32. A single transverse partition 33 is sprung across the furnace providing an oven between it and the roof thereof into which the tubes to be treated may be inserted and removed through the opening 34 equipped with the door 35. At the end opposite the opening 34 and directly over the combustion chamber 36 is the stack 37. The hot fumes and gases from the combustion chamber traverse the flue 38 below partition 33 and the series of apertures 39 which open into the customary flues extending along the sides of the oven, and discharge into the stack, thus thoroughly heating the oven.

In operation whenever the inner wall of the furnace expands or contracts, the overlapping ends 4 and 5 ride over each other compensating for the resulting changes in the body of the furnace. Whether expansion or contraction takes place, the outer shell is always under tension of spring 10 to maintain the inner compression wall 1 under pressure, assuring a stable structure and one in which disintegration and burning out of the inner refractory wall is prevented. Whenever it becomes desirable to vary the tension of the member 2, all that is necessary is to give the nut 11 a few turns in the proper direction thus putting the spring 10 under greater or less tension as desired.

The construction defined provides a very stable structure, one which is simple and efficient in operation, easy to manufacture and repair and which can be easily adjusted to meet exigencies as they arise.

I claim:

1. A stationary substantially horizontal furnace or oven comprising a stable continuous curved inner wall of refractory material under compression, and an outer metal shell surrounding the same for maintaining the inner wall under compression and resisting stresses due to expansion thereof, the metal shell being provided with a slip joint and means for maintaining the same under constant tension.

2. A stationary substantially horizontal furnace or oven comprising a stable continuous curved inner wall of refractory material under compression, and an outer metal shell surrounding the same for maintaining the inner wall under compression and resisting stresses due to expansion and contraction thereof, and springs for maintaining the outer shell under tension.

3. A stationary substantially horizontal furnace or oven comprising a stable continuous curved inner wall of refractory material under compression, and an outer metal shell surrounding the same for maintaining the inner wall under compression and resisting stresses due to expansion thereof, and a superimposed arch forming a flue with a portion of the outer surface of the furnace.

4. A stationary substantially horizontal furnace or oven comprising a stable continuous curved inner wall of refractory material under compression, and an outer metal shell surrounding the same for maintaining the inner wall under compression and resisting stresses due to expansion thereof, and a superposed arch of different curvature than the outer surface of the furnace for forming a crescent-shaped flue therewith.

5. A stationary substantially horizontal furnace or oven comprising a stable continuous curved inner wall of refractory material under compression, and an outer metal shell surrounding the same for maintaining the inner wall under compression and resisting stresses due to expansion thereof, and a pair of superposed exterior arches cooperating and forming flues therewith.

6. A stationary substantially horizontal furnace or oven comprising a stable continuous curved inner wall of refractory material under compression, and an outer metal shell surrounding the same for maintaining the inner wall under compression and resisting stresses due to expansion thereof, a superposed arch of different curvature than the outer surface of the furnace for forming an intermediate flue therewith for the passage of air, and another arch superposed on the first named arch to form an outer flue for the passage of heated gases whereby the air within the intermediate flue is heated by both the furnace and outer flue.

In testimony whereof, I sign my name.

PERRY R. CASSIDY.

Witness:
EDWIN O. JOHNS.